United States Patent [19]

Mayer et al.

[11] Patent Number: 5,441,131
[45] Date of Patent: Aug. 15, 1995

[54] ASYMMETRY/OVERSPEED BRAKE UNIT

[75] Inventors: Edward A. Mayer, West Orange; Gary S. Ruschke, Edison, both of N.J.

[73] Assignee: Curtiss Wright Flight Systems Inc., Fairfield, N.J.

[21] Appl. No.: 339,409

[22] Filed: Nov. 14, 1994

[51] Int. Cl.[6] .................................................. B60T 8/78
[52] U.S. Cl. ................................... 188/180; 188/71.5; 192/12 D; 192/147
[58] Field of Search ................... 188/71.5, 180, 181 R, 188/181 T, 187; 192/12 D, 17 C, 18 B, 84 A, 84 R, 147; 74/411.5

[56] References Cited

U.S. PATENT DOCUMENTS

| | | | |
|---|---|---|---|
| 4,250,983 | 2/1981 | Handke | 192/12 D |
| 5,360,091 | 11/1994 | Sommer | 192/18 B |

Primary Examiner—Robert J. Oberleitner
Assistant Examiner—Chris Schwartz
Attorney, Agent, or Firm—Klauber & Jackson

[57] ABSTRACT

An asymmetry/overspeed brake unit designed to stop the rotation of a control surface and its attending drive set and attachment hardware in response to a mechanical overspeed condition or an electrical signal from a flight control computer. The asymmetry/overspeed brake unit comprising a brake housing having a rotatable main shaft running axially therethrough and a locking mechanism, a braking mechanism, a mechanical trip mechanism, and an electrical trip mechanism, all contained within the brake housing. The asymmetry/overspeed brake unit further comprising a mechanical reset mechanism and a trip indication mechanism, both contained within the brake housing.

18 Claims, 9 Drawing Sheets

ASYMMETRY/OVERSPEED BRAKE UNIT

BACKGROUND OF THE INVENTION

1. Field of the Invention

The present invention relates to brake systems and, more particularly, to an asymmetry/overspeed brake unit for use in aircraft flight control systems and the like.

2. Description of the Prior Art

The present invention asymmetry/overspeed brake unit is an invention, which, in the embodiment described herein, was conceived for use on high performance aircraft. The brake unit was designed for use in critical flight control systems to provide a safety brake in the event of a system malfunction.

Aircraft control surface actuation is a severe environment in which safety brakes must operate. The physical environment includes wide extremes of temperature, altitude, and weather. It also includes the severe vibration environment typical of modern aircraft. The performance requirements are equally severe. High performance aircraft put demanding loads on control surfaces and subsequently the actuation system. These conditions require a brake unit which can provide a fast response to a malfunction signal.

Due to the demanding restraints of aircraft design requirements, the design of brake devices is dominated by the need to produce a brake device which is both compact and light weight. The present invention is the result of practices and decisions designed to meet these strict needs.

SUMMARY OF THE INVENTION

The present invention contemplates an asymmetry/overspeed brake unit that is designed to stop the rotation of a control surface and its attending drive set and attachment hardware in response to a mechanical overspeed condition or an electrical signal from a flight control computer.

Within the asymmetry/overspeed brake unit is a ball-ramp actuated, (multiple) friction brake mechanism comprising an inboard brake plate, an outboard brake plate, a brake plate wave spring, brake balls, a plurality of rotatable brake disks, and a corresponding plurality of fixed brake disks. The brake mechanism is held in an unlocked position by a locking mechanism until released by a trip command. The locking mechanism will keep the brake unlocked even when exposed to large shaft acceleration transients. Upon release, the inboard and outboard brake plates are separated by the brake plate wave spring and by the brake balls. The outboard brake plate is spline coupled to the main shaft. The brake balls are held in conical pockets machined into both of the brake plates. The brake balls drive the inboard brake plate so that both brake plates rotate together. The inboard brake plate is spline coupled to the plurality of rotatable brake disks which are intermingled with the corresponding plurality of fixed brake disks that are slidably secured to the brake housing. As the inboard and outboard brake plates are separated by the ramps formed by the conical pockets, the inboard brake plate applies increasing axial force to the rotatable brake disks which in turn apply increasing axial force against the fixed brake disks until the friction torque developed therebetween exceeds the torque of the main shaft and motion stops.

The brake disks may be made of a variety of friction materials including metallic alloys and/or non-metallic composites. The brake mechanism described herein operates under dry conditions, but may be lubricated as conditions warrant.

The locking mechanism, which holds the brake plates together, comprises a set of radially positioned locking balls and a ball sleeve which prevent axial motion of the inboard brake plate. The locking balls are retained in the ball sleeve which is free to translate axially when the locking balls are released but is mechanically keyed to the brake housing so as to prevent rotation. Upon release of the locking balls, axial motion is transmitted from the inboard brake plate to the ball sleeve through a conrad-type ball bearing.

The locking balls are configured in a manner similar to a standard air hose coupling in that they are trapped in the ball sleeve between a shoulder machined into the brake housing on the outside and a trigger sleeve on the inside. When the trigger sleeve is pushed out from under the locking balls they become free to drop below the housing shoulder and release the ball sleeve for axial motion.

The trigger sleeve is the common element in releasing the brake mechanism for both mechanical and electrical trips. The trigger sleeve is machined with an input cam having a cam face which mates with an electrical trip drive train and a shoulder below the input cam for contact with an overspeed governor sleeve. The trigger sleeve is separated from the ball sleeve by a trigger sleeve wave spring. The trigger sleeve wave spring allows the trigger sleeve to withstand shock and vibration and is designed so as to have a preload and spring constant that is considerably less than that of the brake plate wave spring.

The overspeed governor comprises a plurality of flyballs, a flyball carrier, a overspeed governor wave spring and a overspeed governor sleeve. The flyballs are caged radially in the ball carrier which is concentric about and spline coupled to the main shaft. Each flyball is trapped in a respective pocket in the carrier, each of which contains straight sides to eliminate tangential motion. Each flyball is trapped between a radial face on the overspeed governor sleeve, the bottom of a respective pocket, and a tapered back of a respective pocket. As each flyball flies out radially due to an overspeed condition, it is constrained to translate axially due to the taper in the pocket thereby applying considerable force to the overspeed governor sleeve. The overspeed governor sleeve is preloaded against the flyballs by the overspeed governor wave spring whose characteristics are chosen to provide the proper trip speed. At the end of travel, the flyballs contact the top of the carrier such that the impact is contained by the carrier and not imparted to the overspeed governor sleeve.

The overspeed governor sleeve is free to accelerate through a small distance before it strikes the trigger sleeve. Once the overspeed governor sleeve strikes the trigger sleeve, the trigger sleeve is forced out from under the locking balls thereby freeing the ball sleeve for axial motion and releasing the brake mechanism.

The electrical trip mechanism utilizes a solenoid activated electric clutch and a suitable drive train to convert rotational motion of the main shaft into translational motion of the trigger sleeve. An output gear on the main shaft drives an input gear on an input clutch shaft, parallel to the main shaft, through a one to one gear ratio. The input clutch shaft is directly coupled to the armature of the solenoid activated electric clutch. The clutch armature rotates in front of a clutch rotor until an electrical signal is received. When such an electrical signal is received from the flight control computer, thereby activating the solenoid, the armature is drawn into contact with the rotor causing torque to be transmitted to an output clutch shaft.

The output clutch shaft has an output gear that is geared to an input gear of an input gear/output cam through a torque increasing 1.9 to 1 gear ratio. The input gear/output cam is set within the brake housing with an integral, full complement, angular contact bearing that is concentric about the main shaft. Torque transmitted to the input gear of the input gear/output cam is converted into axial force by an output cam of the input gear/output cam. The output cam of the input gear/output cam has a cam face that mates with the cam face of the input cam on the trigger sleeve. Thus, the axial force converted by the output cam of the input gear/output cam is realized as axial motion of the trigger sleeve wherein the trigger sleeve, being keyed to the housing to prevent rotation, is moved out from under the locking balls thereby freeing the ball sleeve for axial motion and releasing the brake mechanism.

After a brake trip occurs the brake mechanism must be manually reset by a reset mechanism. Since the brake plate wave spring has a higher preload and spring constant than the trigger sleeve wave spring, the ball sleeve will remain in the locked state until it is manually returned to the unlocked position.

The reset mechanism comprises a sector gear that is geared directly to a rack on the ball sleeve. The sector gear is coupled to a reset shaft which protrudes out of the brake housing on both sides of the brake unit. The reset shaft may be turned by a standard hex key wrench and is machined with an indicator mark to verify that the brake mechanism is reset. The components of the reset mechanism are designed of high strength materials so that if the mechanism is overtorqued, then the hex key wrench will break before the components.

The brake unit is equipped with a trip indication switch to signal that the brake mechanism has been engaged. The trip indication switch has a plunger for activation and is preferably hermetically sealed. The switch is mounted to a threaded plate and the threaded plate is then bolted to the brake housing. When first installed, the switch plunger is in contact with the sector gear and the trip indication switch is in a normally open position. Rotation of the sector gear during a trip forces the switch plunger to close the trip indication switch and hold it closed until the unit is manually reset.

In order to reduce variations in the overspeed trip point, the brake unit contains no grease or oil lubrication except for the bearings which are grease lubricated and sealed for life. Other moving parts are lubricated using dry film lubricants as deemed appropriate.

From the above descriptive summary it is apparent how the present invention asymmetry/overspeed brake unit conforms to the demanding restraints of aircraft design and performance requirements.

Accordingly, the primary objective of the present invention is to provide an asymmetry/overspeed brake unit that is designed to stop the rotation of a control surface and its attending drive set and attachment hardware in response to a mechanical overspeed condition or an electrical signal from a flight control computer.

Other objectives and advantages of the present invention will become apparent to those skilled in the art upon reading the following detailed description and claims, in conjunction with the accompanying drawings which are appended hereto.

BRIEF DESCRIPTION OF THE DRAWINGS

In order to facilitate a fuller understanding of the present invention, reference is now be made to the appended drawings. The drawings should not be construed as limiting the present invention, but are intended to be exemplary only.

PREFERRED EMBODIMENT OF THE PRESENT INVENTION

Figure 1:
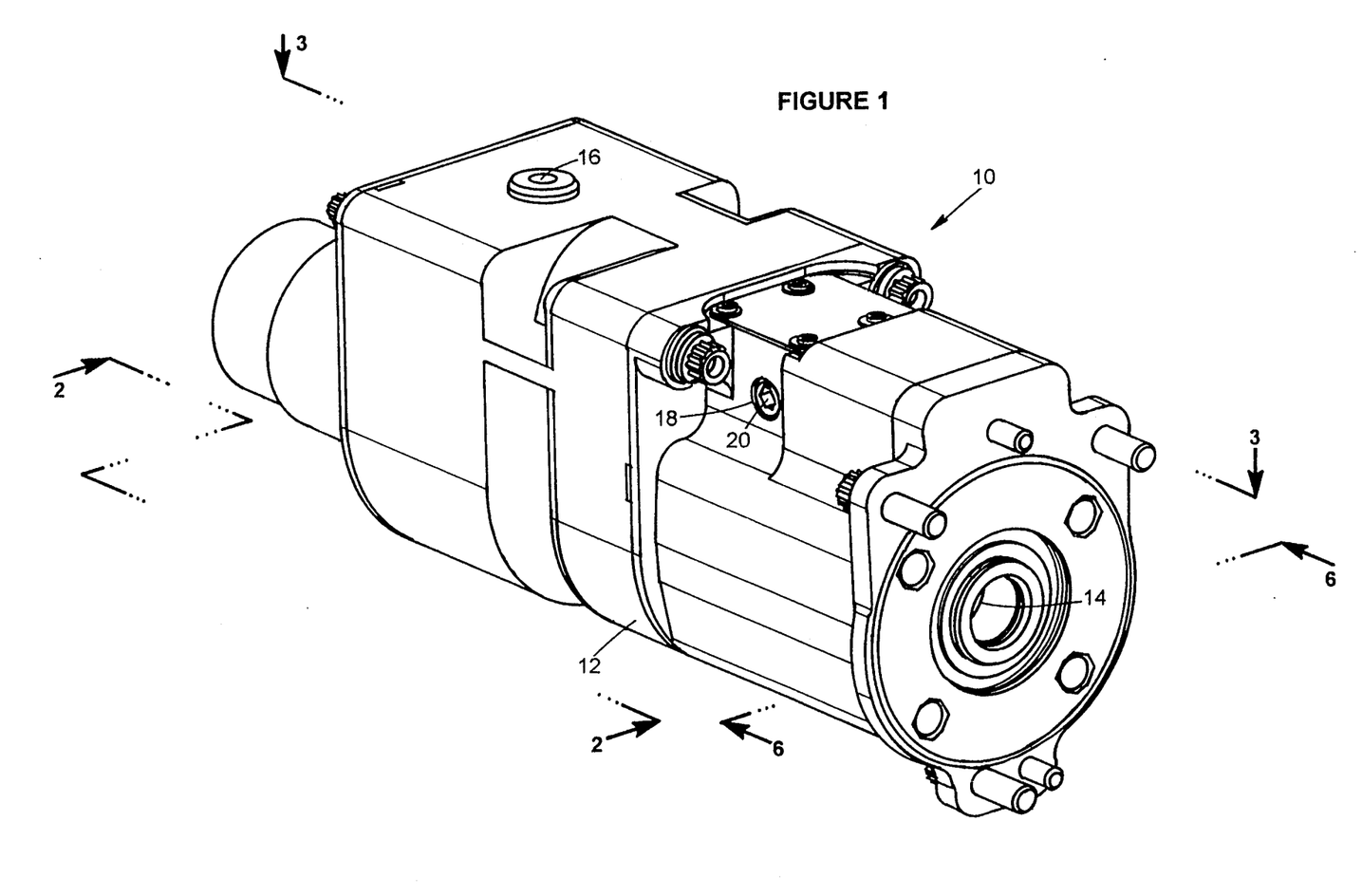
FIG. 1 is a three dimensional perspective view of an asymmetry/overspeed brake unit according to the present invention.
Figure 2:
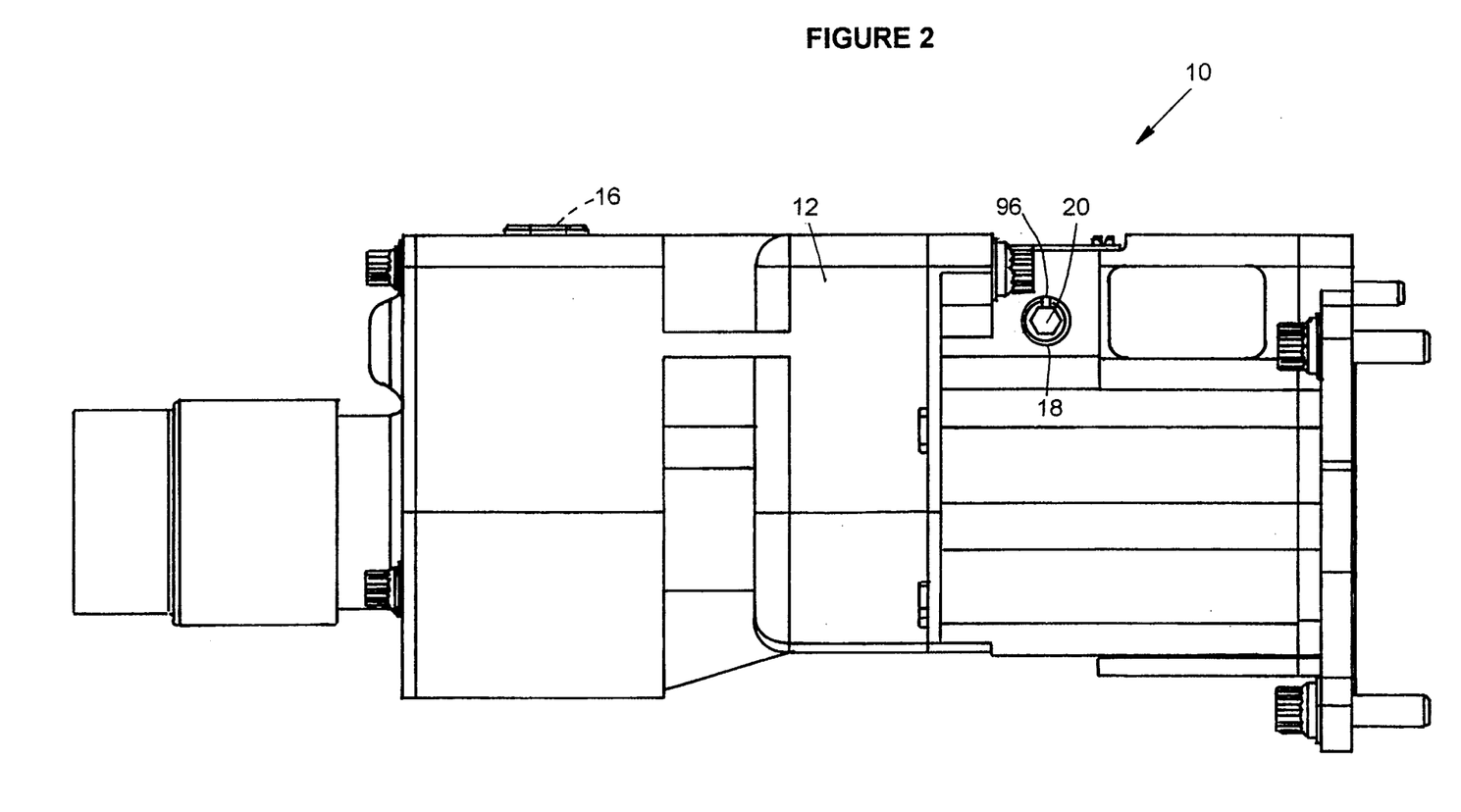
FIG. 2 is a side view of the asymmetry/overspeed brake unit shown in FIG. 1 taken along line 2—2 of FIG. 1.
Figure 3:
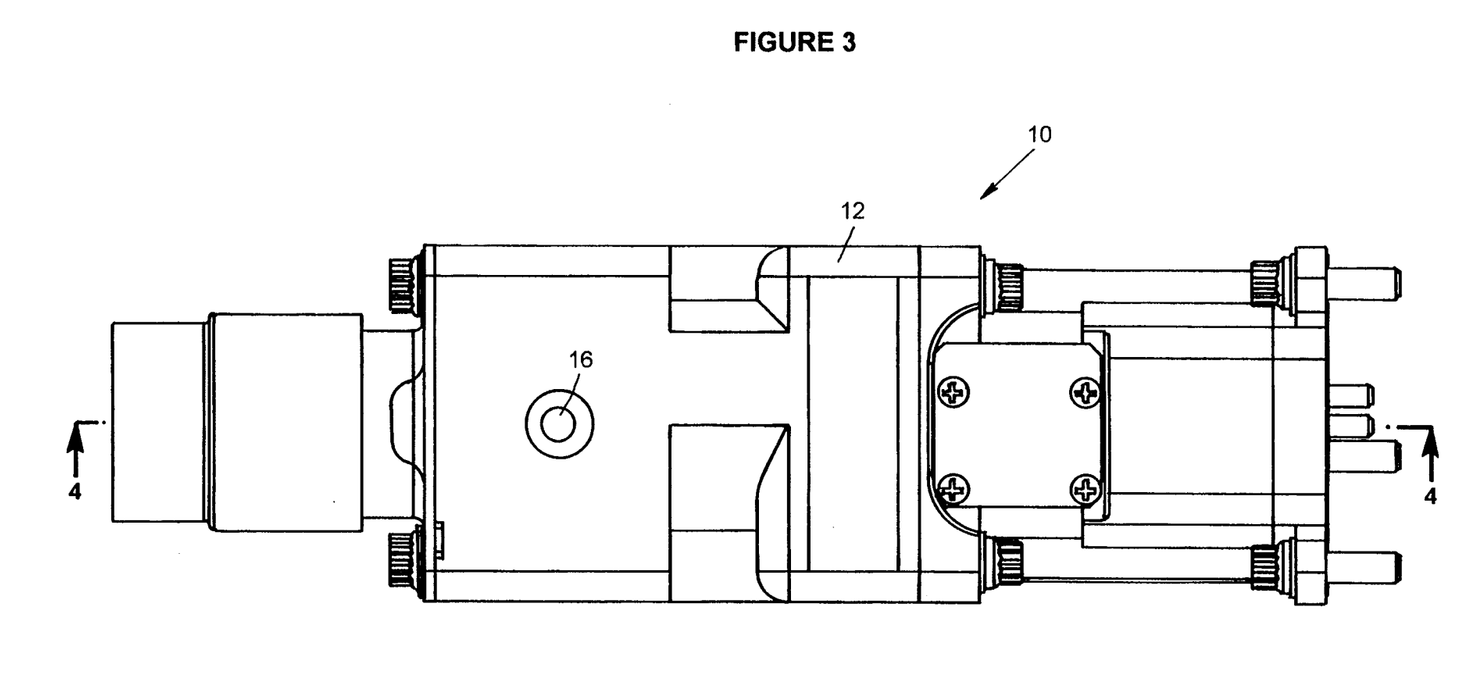
FIG. 3 is a top view of the asymmetry/overspeed brake unit shown in FIG. 1 taken along line 3—3 of FIG. 1.

Referring to FIG. 1, there is shown a three dimensional perspective view of an asymmetry/overspeed brake unit 10 according to the present invention. The asymmetry/overspeed brake unit 10 comprises a multi-sectional brake housing 12 with a main shaft 14 running axially therethrough. The brake housing 12 provides an grommetted opening 16 through which an electrical connection may be made with trip electronics within the brake housing 12. The brake housing 12 also provides an opening 18 for a reset shaft 20 so that the brake unit 10 may be manually reset. FIGS. 2 and 3 are a side view and a top view of the asymmetry/overspeed brake unit 10, respectively.

Figure 4:
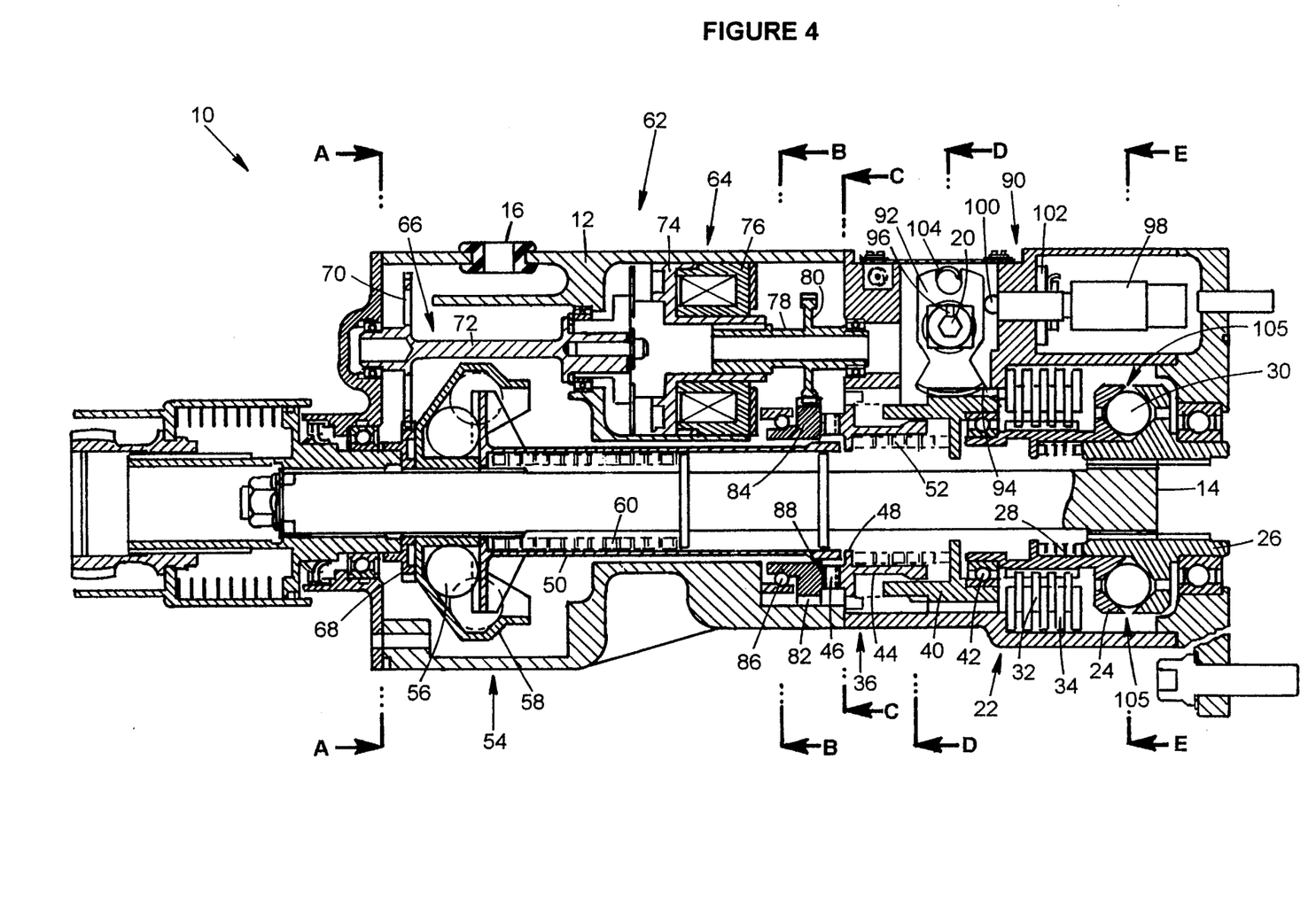
FIG. 4 is a cross-sectional view of the asymmetry/overspeed brake unit shown in FIG. 1 taken along line 4—4 of FIG. 3.
Figure 5:
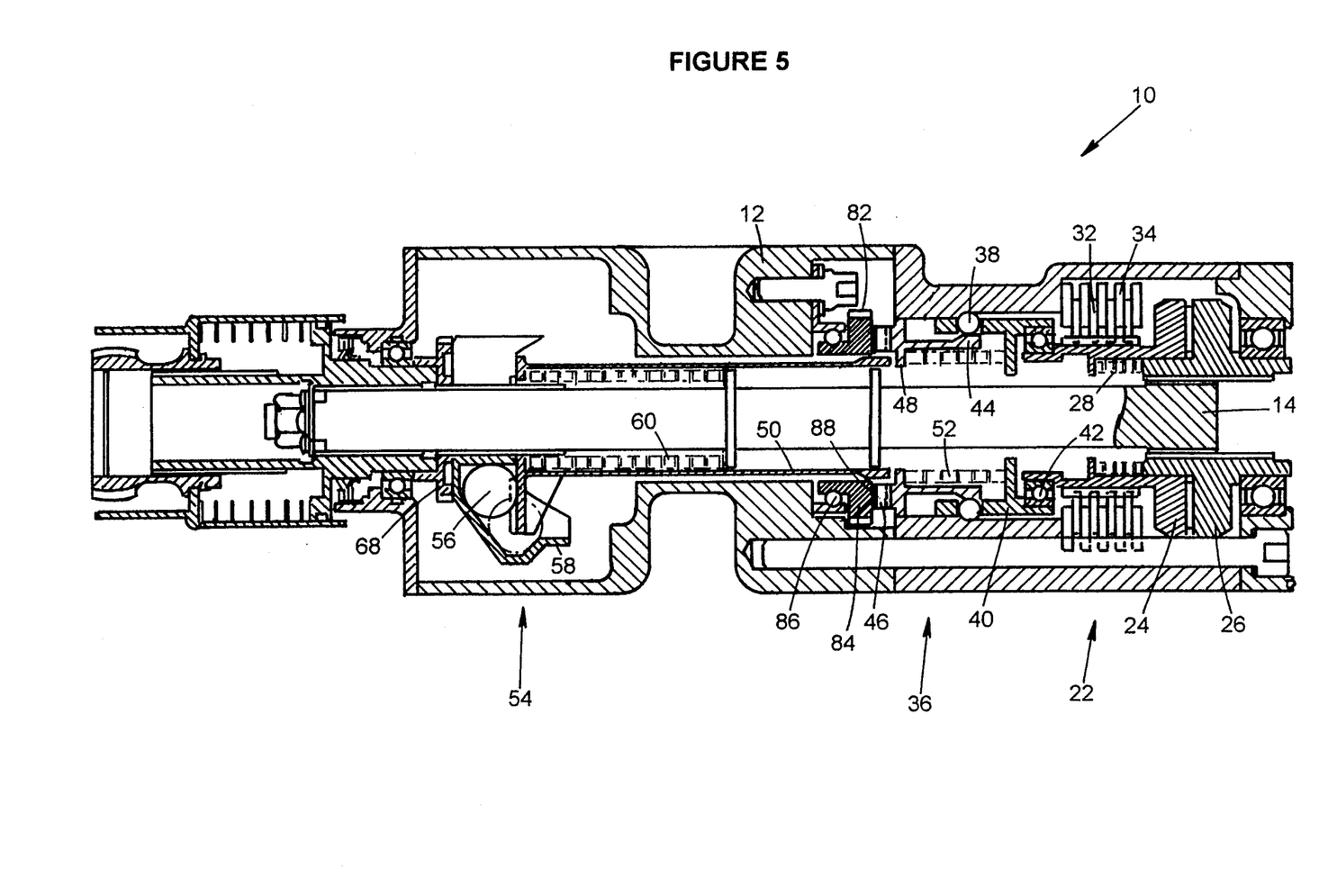
FIG. 5 is a cross-sectional view of the asymmetry/overspeed brake unit shown in FIG. 1 taken along line G—G of FIG. 10.
Figure 6:
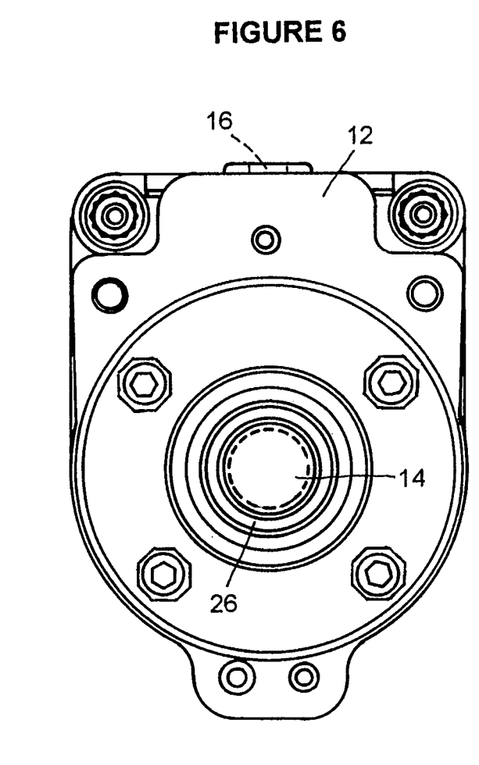
FIG. 6 is an end view of the asymmetry/overspeed brake unit shown in FIG. 1 taken along line 6—6 of FIG. 1.
Figure 11:
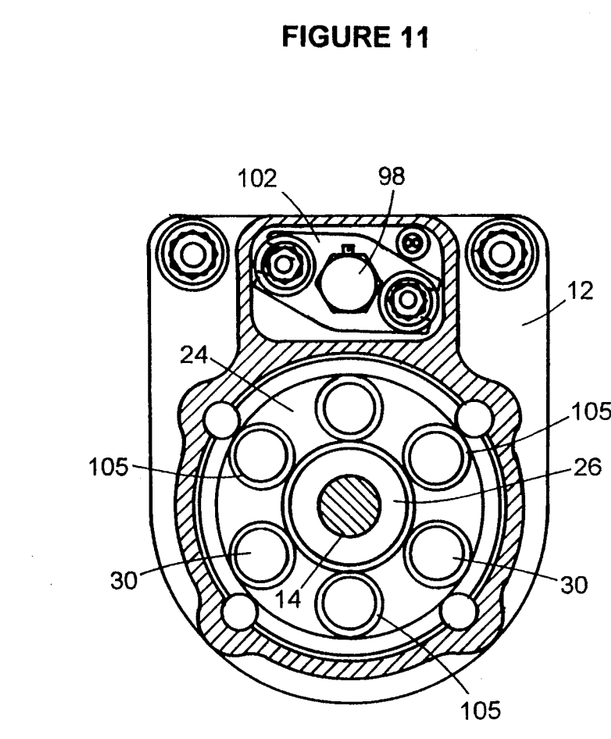
FIG. 11 is a cross-sectional view of the asymmetry/overspeed brake unit shown in FIG. 1 taken along line E—E of FIG. 4.

Referring to FIGS. 4 and 5, there are shown cross-sectional views of the asymmetry/overspeed brake unit 10 revealing the brake mechanism 22 contained therein. The brake mechanism 22 comprises an inboard brake plate 24, an outboard brake plate 26, a brake plate wave spring 28, brake balls 30, a plurality of rotatable brake disks 32, and a corresponding plurality of fixed brake disks 34 (also see FIG. 11). The brake mechanism 22 is held in an unlocked position by a locking mechanism 36 until released by a trip command. The locking mechanism 36 keeps the brake mechanism 22 unlocked even when exposed to large acceleration transients by the main shaft 14. Upon release, the rotating inboard and outboard brake plates 24,26 are separated by the brake plate wave spring 28 and by the brake balls 30. The outboard brake plate 26 is spline coupled to the main shaft 14. The brake balls 30 are held in conical pockets 105 machined into both of the brake plates 24,26. The brake balls 30 drive the inboard brake plate 24 so that both brake plates rotate together. The inboard brake plate 24 is spline coupled to the plurality of rotatable brake disks 32 which are intermingled with the corresponding plurality of fixed brake disks 34 that are slidably secured to the brake housing 12. As the inboard and outboard brake plates 24,26 are separated by the ramps formed by the conical pockets 105, the inboard brake plate 24 applies increasing axial force to the rotatable brake disks 32 which in turn apply increasing axial force against the fixed brake disks 34 until the friction torque developed therebetween exceeds the torque of the main shaft 14 and motion stops.

The brake disks 32,34 may be made of a variety of friction materials including metallic alloys and/or non-metallic composites. Although the brake mechanism 22 operates under dry conditions, it may be lubricated as conditions warrant.

Figure 9:
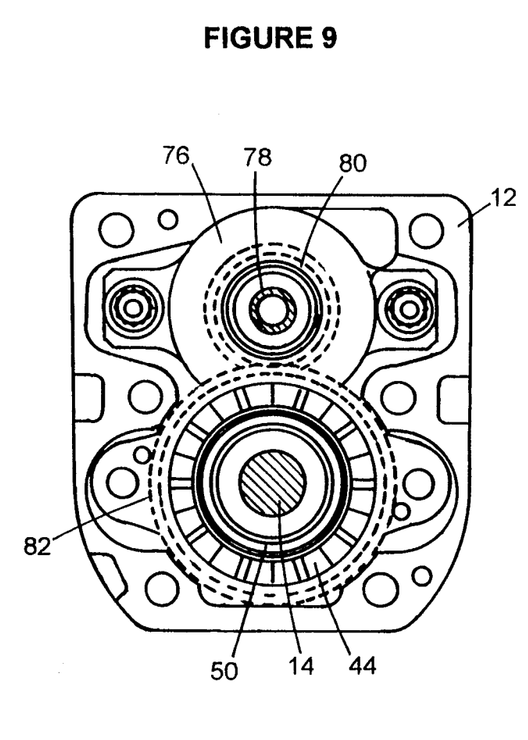
FIG. 9 is a cross-sectional view of the asymmetry/overspeed brake unit shown in FIG. 1 taken along line C—C of FIG. 4.
Figure 10:
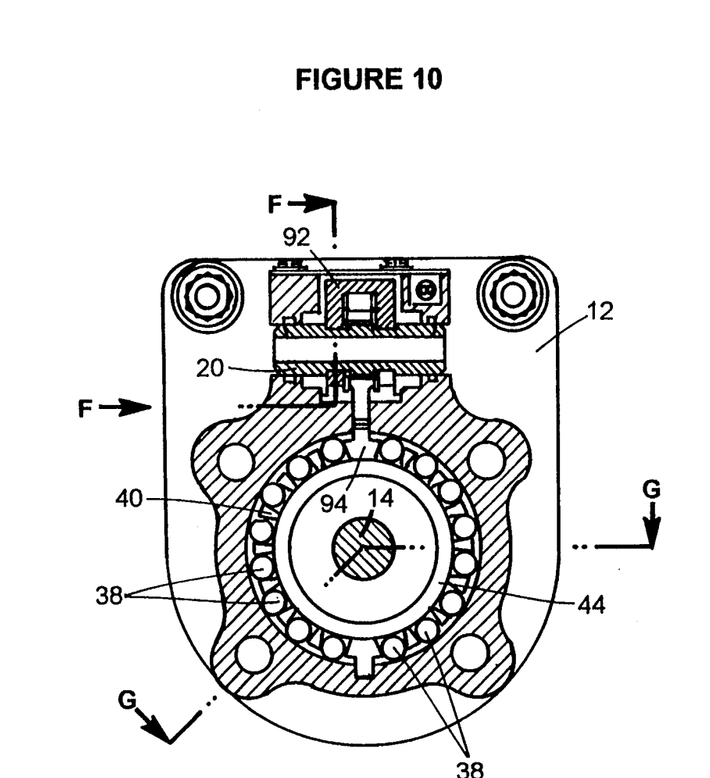
FIG. 10 is a cross-sectional view of the asymmetry/overspeed brake unit shown in FIG. 1 taken along line D—D of FIG. 4.

The locking mechanism 36, which holds the brake plates 24,26 together, comprises a set of radially positioned locking balls 38 and a ball sleeve 40 which prevent axial motion of the inboard brake plate 24 (also see FIGS. 9 and 10). The locking balls 38 are retained in the ball sleeve 40 which is free to translate axially when the locking balls 38 are released but is mechanically keyed to the brake housing 12 so as to prevent rotation. Upon release of the locking balls 38, axial motion is transmitted from the inboard brake plate 24 to the ball sleeve 40 through a conrad-type ball bearing 42.

The locking balls 38 are configured in a manner similar to a standard air hose coupling in that they are trapped in the ball sleeve 40 between a shoulder machined into the brake housing 12 on the outside and a trigger sleeve 44 on the inside. When the trigger sleeve 44 is pushed out from under the locking balls 38 they become free to drop below the shoulder in the housing 12 and release the ball sleeve 40 for axial motion.

The trigger sleeve 44 is the common element in releasing the brake mechanism 22 for both mechanical and electrical trips. The trigger sleeve 44 is machined with an input cam 46 having a cam face that mates with an electrical trip drive train 66 and a shoulder 48 below the input cam 46 for contact with an overspeed governor sleeve 50. The trigger sleeve 44 is separated from the ball sleeve 40 by a trigger sleeve wave spring 52. The trigger sleeve wave spring 52 allows the trigger sleeve 44 to withstand shock and vibration and is designed so as to have a preload and spring constant that is considerably less than that of the brake plate wave spring 28.

Figure 7:
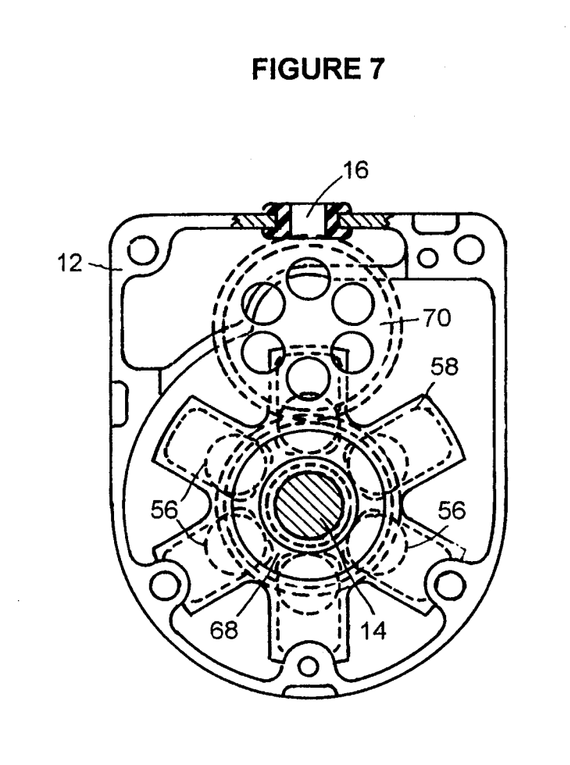
FIG. 7 is a cross-sectional view of the asymmetry/overspeed brake unit shown in FIG. 1 taken along line A—A of FIG. 4.

The overspeed governor trip mechanism 54 comprises a plurality of flyballs 56, a flyball carrier 58, a overspeed governor wave spring 60, and the overspeed governor sleeve 50 (also see FIG. 7). The flyballs 56 are caged radially in the ball carrier 58 which is concentric about and spline coupled to the main shaft 14. Each flyball 56 is trapped in a respective pocket in the carrier 58, each of which contains straight sides to eliminate tangential motion. Each flyball 56 is trapped between a radial face on the overspeed governor sleeve 50, the bottom of a respective pocket, and a tapered back of a respective pocket. As each flyball 56 flies out radially due to an overspeed condition, it is constrained to translate axially due to the taper in the pocket thereby applying considerable force to the overspeed governor sleeve 50. The overspeed governor sleeve 50 is preloaded against the flyballs 56 by the overspeed governor wave spring 60 whose characteristics are chosen to provide the proper trip speed. At the end of travel, the flyballs 56 contact the top of the carrier 58 such that the impact is contained by the carrier 58 and not imparted to the overspeed governor sleeve 50.

The overspeed governor sleeve 50 is free to accelerate through a small distance before it strikes the trigger sleeve 44. Once the overspeed governor sleeve 50 strikes the trigger sleeve 44, the trigger sleeve 44 is forced out from under the locking balls 38 thereby freeing the ball sleeve 40 for axial motion and releasing the brake mechanism 22.

The electrical trip mechanism 62 utilizes a solenoid activated electric clutch 64 and a suitable drive train 66 to convert rotational motion of the main shaft 14 into translational motion of the trigger sleeve 44. An output gear 68 on the main shaft 14 drives an input gear 70 on an input clutch shaft 72, parallel to the main shaft 14, through a one to one gear ratio (also see FIG. 7). The input clutch shaft 72 is directly coupled to the armature 74 of the solenoid activated electric clutch 64. The clutch armature 74 rotates in front of a clutch rotor 76 until an electrical trip signal is received. When the electrical trip signal is received by the solenoid activated electric clutch 64 through the electrical connection made through the grommetted opening 16, thereby activating the solenoid, the armature 74 is drawn into contact with the rotor 76 causing torque to be transmitted to an output clutch shaft 78.

Figure 8:
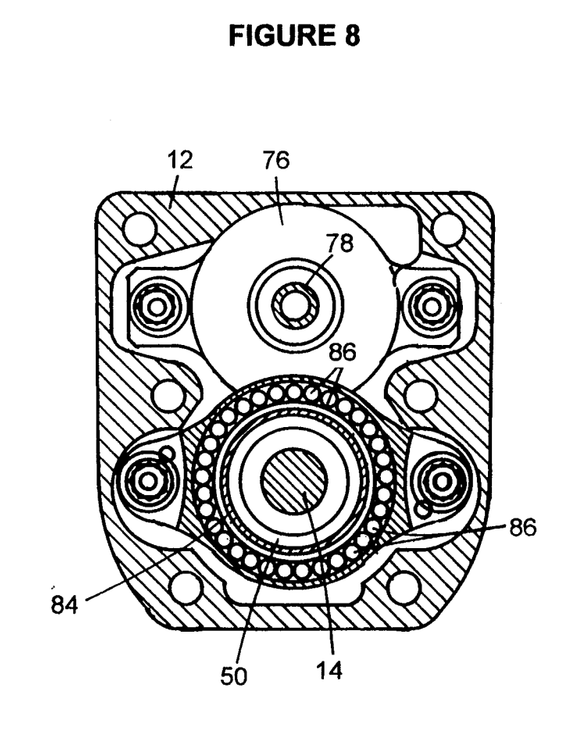
FIG. 8 is a cross-sectional view of the asymmetry/overspeed brake unit shown in FIG. 1 taken along line B—B of FIG. 4.
Figure 13:
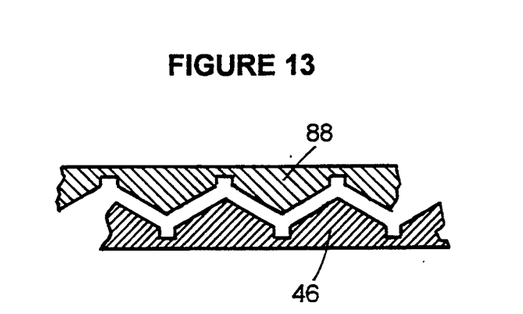
FIG. 13 is an illustration of the interface between the cam face of the input cam on the trigger sleeve and the cam face of the output cam on the input gear/output cam.

The output clutch shaft 78 has an output gear 80 that is geared to an input gear 82 of an input gear/output cam 84 through a torque increasing 1.9 to 1 gear ratio (also see FIG. 9). The input gear/output cam 84 is set within the brake housing 12 with an integral, full complement, angular contact bearing 86 that is concentric about the main shaft 14 (also see FIG. 8). Torque transmitted to the input gear 82 of the input gear/output cam 84 is converted into axial force by an output cam 88 of the input gear/output cam 84. The output cam 88 of the input gear/output cam has a cam face that mates with the cam face of the input cam 46 on the trigger sleeve 44 (also see FIG. 13). Thus, the axial force converted by the output cam 88 of the input gear/output cam 84 is realized as axial motion of the trigger sleeve 44 wherein the trigger sleeve 44, being keyed to the housing 12 to prevent rotation, is moved out from under the locking balls 38 thereby freeing the ball sleeve 40 for axial motion and releasing the brake mechanism 22.

After a brake trip occurs the brake mechanism 22 must be manually reset by a reset mechanism 90. Since the brake plate wave spring 28 has a higher preload and spring constant than the trigger sleeve wave spring 52, the ball sleeve 40 will remain in the locked state until it is manually returned to the unlocked position.

Figure 12:
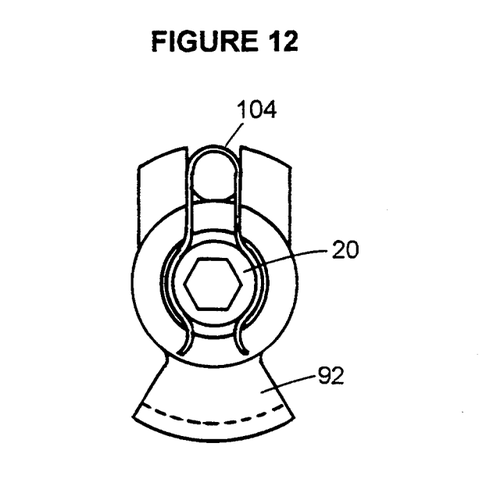
FIG. 12 is a cross-sectional view of the asymmetry/overspeed brake unit shown in FIG. 1 taken along line F—F of FIG. 10.

The reset mechanism 90 comprises a sector gear 92 that is geared directly to a rack 94 on the ball sleeve 40. The sector gear 92 is coupled to the reset shaft 20 (via a retaining clip 104) which protrudes out of the brake housing 12 on both sides of the brake unit 10 (also see FIGS. 10 and 12). The reset shaft 20 may be turned by a standard hex key wrench and is machined with an indicator mark 96 to verify that the brake mechanism 22 is reset. The components of the reset mechanism 90 are designed of high strength materials so that if the mechanism 90 is overtorqued, then the hex key wrench will break before the components.

The brake unit 10 is equipped with a trip indication switch 98 to signal that the brake mechanism 22 has been engaged. The trip indication switch 98, which is typically a MIL-S-8805 qualified travel limit switch, has a plunger 100 for activation and is hermetically sealed. The trip indication switch 98 is mounted to a threaded plate 102 and the threaded plate 102 is bolted to the brake housing 12 (also see FIG. 11). When first installed, the plunger 100 is in contact with the sector gear 92 and the trip indication switch 98 is in a normally open position. Rotation of the sector gear 92 during a trip forces the plunger 100 to close the trip indication switch 98 and hold it closed until the brake unit 10 is manually reset.

In order to reduce variations in the overspeed trip point, the brake unit 10 contains no grease or oil lubrication except for the bearings which are grease lubricated and sealed for life. Other moving parts are lubricated using dry film lubricants as deemed appropriate.

With the present invention asymmetry/overspeed brake unit 10 now fully described, it can thus be seen that the primary objective set forth above is efficiently attained and, since certain changes may be made in the above-described brake unit 10 without departing from the scope of the invention, it is intended that all matter contained in the above description or shown in the accompanying drawings shall be interpreted as illustrative and not in a limiting sense.

What is claimed is:

1. An asymmetry/overspeed brake comprising:

a brake housing having a rotatable main shaft running axially therethrough;

a locking mechanism contained within said brake housing, said locking mechanism having a trigger sleeve concentric with and disposed annularly about said main shaft, a ball retention sleeve concentric with and disposed annularly about said main shaft, and a plurality of locking balls seated within said ball retention sleeve between said brake housing on the outside and said trigger sleeve on the inside, said trigger sleeve and said ball retention sleeve being forcibly opposed by trigger sleeve spring means, said trigger sleeve having a trigger cam and a trigger shoulder formed therein;

a braking mechanism contained within said brake housing, said braking mechanism having a plurality of rotatable brake disks concentric with and disposed annularly about said main shaft, a corresponding plurality of fixed brake disks concentric with and disposed annularly about said main shaft, and rotatable brake plate means concentric with and disposed annularly about said main shaft, said rotatable brake disks being intermingled with said fixed brake disks, said brake plate means being directly coupled to said main shaft, said plurality of rotatable brake disks being spline coupled to said brake plate means, said brake plate means being forcibly biased toward and against said ball retention sleeve by brake plate spring means;

a mechanical trip mechanism contained within said brake housing, said mechanical trip mechanism comprising a rotatable flyball carrier concentric with and disposed annularly about said main shaft, an overspeed governor sleeve concentric with and disposed annularly about said main shaft, and a plurality of flyballs seated within a corresponding plurality of pockets in said flyball carrier, said flyball carrier being directly coupled to said main shaft, said overspeed governor sleeve being forcibly biased toward and against said plurality of flyballs by overspeed governor spring means, said overspeed governor sleeve being axially movable into contact with said trigger shoulder; and an electrical trip mechanism contained within said brake housing, said electrical trip mechanism comprising a solenoid activated electric clutch and a clutch drive train, said clutch drive train having a rotatable input clutch shaft that is gear coupled to said main shaft and a rotatable output clutch shaft that is gear coupled to a rotatable clutch cam, said solenoid activated electric clutch being responsive to an electrical trigger signal for coupling said input clutch shaft to said output clutch shaft, said clutch cam being concentric with and disposed annularly about said main shaft so as to mate with said trigger cam.

2. The asymmetry/overspeed brake as defined in claim 1, further comprising a mechanical reset mechanism contained within said brake housing for resetting said locking mechanism.

3. The asymmetry/overspeed brake as defined in claim 2, wherein said mechanical reset mechanism comprises a reset shaft and a sector gear, wherein said sector gear is directly coupled to said reset shaft, wherein said sector gear is gear coupled to said ball retention sleeve, and wherein said reset shaft is operable from outside of said brake housing.

4. The asymmetry/overspeed brake as defined in claim 3, further comprising a trip indication mechanism contained within said brake housing for indicating whether said asymmetry/overspeed brake has been tripped.

5. The asymmetry/overspeed brake as defined in claim 4, wherein said trip indication mechanism comprises a trip indication switch disposed adjacent said sector gear for sensing displacement of the same.

6. The asymmetry/overspeed brake as defined in claim 1, wherein said brake plate means comprises an outboard brake plate, an inboard brake plate, and a plurality of brake balls, wherein said plurality of brake balls are captively disposed between said outboard brake plate and said inboard brake plate, wherein said outboard brake plate is directly coupled to said main shaft, wherein said inboard brake plate is spline coupled to said plurality of said rotatable brake disks, wherein said inboard brake plate is forcibly biased toward and against said ball retention sleeve by said brake plate spring means, and wherein said outboard brake plate and said inboard brake plate are forcibly opposed by said brake plate spring means.

7. The asymmetry/overspeed brake as defined in claim 6, wherein said inboard brake plate is forcibly biased toward and against said ball retention sleeve by said brake plate spring means through a ball bearing.

8. The asymmetry/overspeed brake as defined in claim 7, wherein said brake plate spring means is a wave spring.

9. The asymmetry/overspeed brake as defined in claim 6, wherein said outboard brake plate is spline coupled to said main shaft.

10. The asymmetry/overspeed brake as defined in claim 1, wherein said input clutch shaft is directly coupled to an armature of said solenoid activated electric clutch.

11. The asymmetry/overspeed brake as defined in claim 10, wherein said output clutch shaft is directly coupled to a rotor of said solenoid activated electric clutch.

12. The asymmetry/overspeed brake as defined in claim 11, wherein said input clutch shaft is coupled to said output clutch shaft when said armature is forced into contact with said rotor in response to said electrical trigger signal.

13. The asymmetry/overspeed brake as defined in claim 1, wherein said ball retention sleeve has a spring shoulder formed therein, and wherein said trigger sleeve spring means is disposed between said spring shoulder and said trigger shoulder.

14. The asymmetry/overspeed brake as defined in claim 13, wherein said trigger sleeve spring means is a wave spring.

15. The asymmetry/overspeed brake as defined in claim 1, wherein said brake housing comprises a multi-sectional brake housing.

16. The asymmetry/overspeed brake as defined in claim 1, wherein said trigger cam has a trigger cam face, wherein said clutch cam has a clutch cam face, and wherein said trigger cam face mates with said clutch cam face.

17. The asymmetry/overspeed brake as defined in claim 1, wherein said overspeed governor spring means is a wave spring.

18. The asymmetry/overspeed brake as defined in claim 1, wherein said flyball carrier is spline coupled to said main shaft.

* * * * *